US010588013B1

(12) United States Patent
Finger et al.

(10) Patent No.: US 10,588,013 B1
(45) Date of Patent: Mar. 10, 2020

(54) DEVICE ACTIVATION ENABLEMENT (71) Applicant: T-Mobile USA, Inc., Bellevue, WA (US)

(72) Inventors: Joshua Finger, Covington, WA (US); Nilesh Ranjan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/252,284

(22) Filed: Jan. 18, 2019

(51) Int. Cl.
*H04W 8/26* (2009.01)
*H04B 1/3816* (2015.01)
*H04W 60/00* (2009.01)

(52) U.S. Cl.
CPC .......... *H04W 8/265* (2013.01); *H04B 1/3816* (2013.01); *H04W 60/00* (2013.01)

(58) Field of Classification Search
CPC ..... H04W 8/265; H04W 12/06; H04W 12/08; H04W 12/12; H04W 12/00512; H04W 84/12; H04W 4/80; H04W 48/02; H04W 60/00; H04B 1/3816; H04L 63/0876; H04L 63/0853; G06F 21/575; H04M 15/47; H04M 2215/0148
See application file for complete search history.

(56) References Cited

U.S. PATENT DOCUMENTS

| 2013/0023236 | A1* | 1/2013 | Murray | H04W 4/50 455/411 |
| 2014/0372743 | A1* | 12/2014 | Rogers | H04L 9/3234 713/2 |
| 2015/0173000 | A1* | 6/2015 | Basilier | H04W 48/18 370/329 |
| 2017/0272950 | A1* | 9/2017 | Venkataramanachari | H04W 12/06 |

* cited by examiner

*Primary Examiner* — Quoc Thai N Vu
(74) *Attorney, Agent, or Firm* — Han Santos, PLLC (57) ABSTRACT

A user device may be authorized to access a telecommunications network, such as a cellular network, after completing a boot process that includes a device activation phase and a network activation phase. An application resident on the user device initiates, in the device activation phase, a device eligibility check over a secondary communication network such as a WLAN. Device eligibility may be determined by whether the user device was legitimately sold. If the user device fails the eligibility check, the boot process is stopped, rendering the user device inactive. If the user device passes the eligibility check, the application initiates the network activation phase in which the user device is checked against a blacklist. If the user device is blacklisted, the boot process is shut down. If the user device is not blacklisted, the boot process completes normally.

20 Claims, 8 Drawing Sheets

DEVICE ACTIVATION ENABLEMENT

BACKGROUND

User devices, including cellular phones, have become both expensive and desirable. This has made such devices targets for fraud against cellular carriers and for theft in retail stores and in transit to users. A user device rendered unactivatable or useless may discourage fraudulent behavior and theft by making the device less desirable and less valuable. Some anti-theft and anti-fraud approaches such as equipment identity register (EIR) blocking and other anti-theft solutions may apply only after purchase. Others, including remote subscriber identify module (SIM) unlock (remote SIM unlock, or RSU), may only have scope for specific carriers.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to one or more techniques that may perform a device eligibility check in a device activation phase (e.g., the "out-of-box setup") prior to a network activation phase (e.g., activation for access to a telecommunications carrier network). A setup wizard may connect the user device to the carrier to perform the eligibility check via a Wireless Local Area Network (WLAN) connection in the device activation phase before completing the boot process in the network activation phase to obtain authority to connect to a telecommunications carrier network. In this way, the user device may be disabled, with reduced or no functionality, on failing the eligibility check before attempting network activation. As a result, fraudulent behavior and theft may be discouraged in this way by making the device less desirable and less valuable.

In various embodiments, the user device may provide a configuration interface that permits the user to initiate a device activation phase in which the eligibility check is made via a secondary communication network (e.g., a WLAN such as Wi-Fi (a trademark of the Wi-Fi Alliance)) or other alternative networks. For example, the configuration interface may be a client application interface. The device activation phase may be initiated in a secure execution environment (SEE) resident in the user device's processor. In some embodiments, the SEE may be resident in a secure computer-readable memory that is physically separate from the user device's processor.

A SEE is a set of hardware of a user device that is not accessible by users and therefore is trusted not to include malware. A SEE may generically include a processing area of a dedicated processor and/or an area of dedicated memory that is only accessible by an original equipment manufacturer (OEM) or a telecommunications carrier. Example SEE's include the Trusted Execution Environment by Trustonic™ and the QSEE by Qualcomm™.

Thus, when the user device is to be activated for access to a network of a telecommunications carrier, e.g., a cellular network, the eligibility check may be performed during the device activation phase (i.e., before entering the network activation phase to obtain authorization by the telecommunications carrier and enabling access to the telecommunications carrier network). If the eligibility check is failed, the boot process is shut down and the user device does not enter the network activation phase, leaving the user device without access to the telecommunications carrier network or other resources of the telecommunications carrier. On the other hand, if the eligibility check is successful, the user device may continue to boot and request network activation for access to the telecommunications carrier network.

Figure 1:
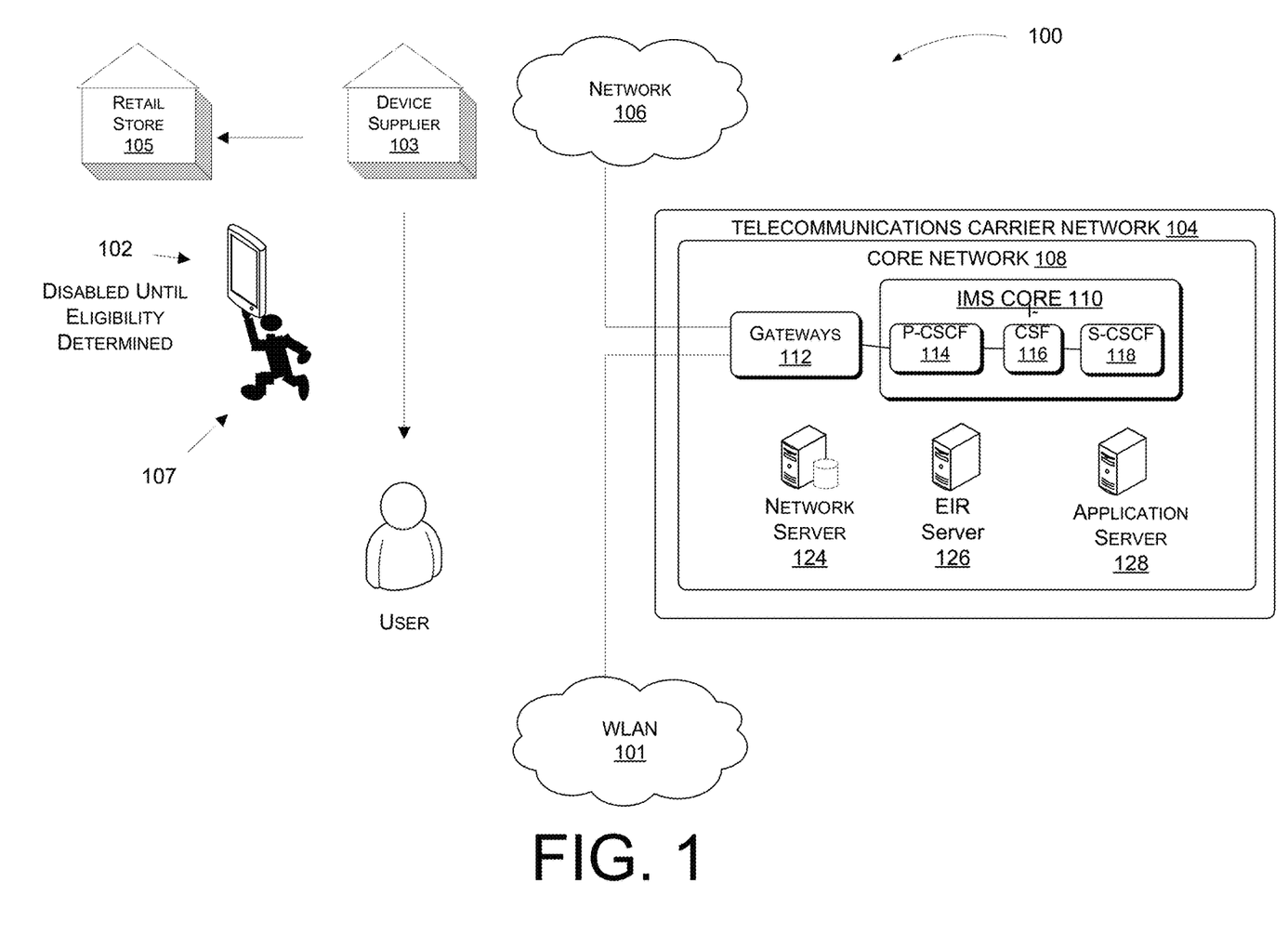
FIG. 1 illustrates an example network architecture to implement device activation enablement.

FIG. 1 illustrates an example network architecture 100 to implement device activation enablement. The network architecture 100 may include a WLAN 101, a user device 102, and a telecommunications carrier network 104, which in one or more embodiments may be a cellular network. The user device 102 may be a smartphone, a smartwatch, a tablet computer, a phablet computer, or any other computing device that is capable of communicating with other devices via the WLAN 101 or the telecommunications carrier network 104. The telecommunications carrier network 104 may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or so forth.

The telecommunications carrier network 104 may include a radio access network 106 and a core network 108. The radio access network 106 may include multiple base stations. The multiple base stations are responsible for handling voice and data traffic between multiple user devices, such as the user device 102, and the core network 108. Accordingly, each of the base stations may provide a corresponding network cell that delivers telecommunication and data communication coverage. The core network 108 may use the network cells to provide communication services to the multiple user devices.

In various embodiments, the core network 108 of the telecommunications carrier network 104 may include an IP Multimedia Subsystem (IMS) core 110. The IMS core 110 may be accessed via one or more gateways 112 and related components that are tasked with providing connectivity between the telecommunications carrier network 104 and user devices, including the user device 102, by acting as a point of entry and exit for data traffic. In turn, the IMS core 110 may provide the user devices with data access to external packet data networks, such as the networks of other telecommunications carrier networks. The IMS core 110 may include a Proxy Call Session Control Function (P-CSCF) 114 or an equivalent function. The P-CSCF 114 may route incoming Session Initiation Protocol (SIP) messages to an IMS registrar server. The P-CSCF 114 may also safeguard the security of the IMS core 110 by handling Internet Protocol Security (IPSec) for communications that are exchanged with user devices. In some alternative instances, instead of SIP sessions, the P-CSCF 114 may handle Remote Authentication Dial-In User Service (RADIUS) sessions. The P-CSCF 114 may interact with an Interrogating CSCF (I-CSCF) 116 and a Serving CSCF (S-CSCF) 118. In some instances, the I-CSCF 116 may be an inbound SIP proxy server of the IMS core 110. During IMS registration of a user device, the I-CSCF 116 may query a home subscriber server (HSS) to designate an S-CSCF to service the user device. The I-CSCF 116 may be further responsible for routing incoming IMS session requests and terminating IMS sessions requests.

The core network 108 may further include a rules and/or billing function, such as a Policy and Charging Rules Function (PCRF) or another equivalent rules engine and/or billing function. For example, a billing function may enable the telecommunications carrier network 104 to monitor the services, such as data, voice, text, etc., that are used by each subscriber of the telecommunications carrier network 104 and charge the subscribers and/or other parties in real-time based on service usage. In various embodiments, the billing function may be an Online Charging System (OCS) or another equivalent core network component of the telecommunications carrier network 104.

The core network 108 may include a network server 124 configured to determine eligibility of the user device 102 during the device activation phase, an equipment Identify registration (EIR) server 126 to store a database of user devices identified by their international mobile equipment identity (IMEI) numbers, and an application server 128 to store applications accessible by user devices and other equipment.

Commonly, user devices such as the user device 102 are distributed by device suppliers for sale by retail stores or directly to consumers. The user devices are vulnerable to theft in both scenarios; user devices are sometimes stolen from retail store stock or while in transit from the device supplier to the retail store or consumer. In the example shown in FIG. 1, a malicious actor 107 is depicted running with a stolen user device 102, which is in a disabled state.

It should be noted that fraud on the telecommunications carrier (e.g., through unauthorized use of a user device for lack of payment or identity theft) is also a risk. However, pre-existing anti-theft and anti-fraud solutions generally assume that the user device 102 is already activated. The present subject matter provides anti-theft and anti-fraud functionality without activation.

Figure 2:
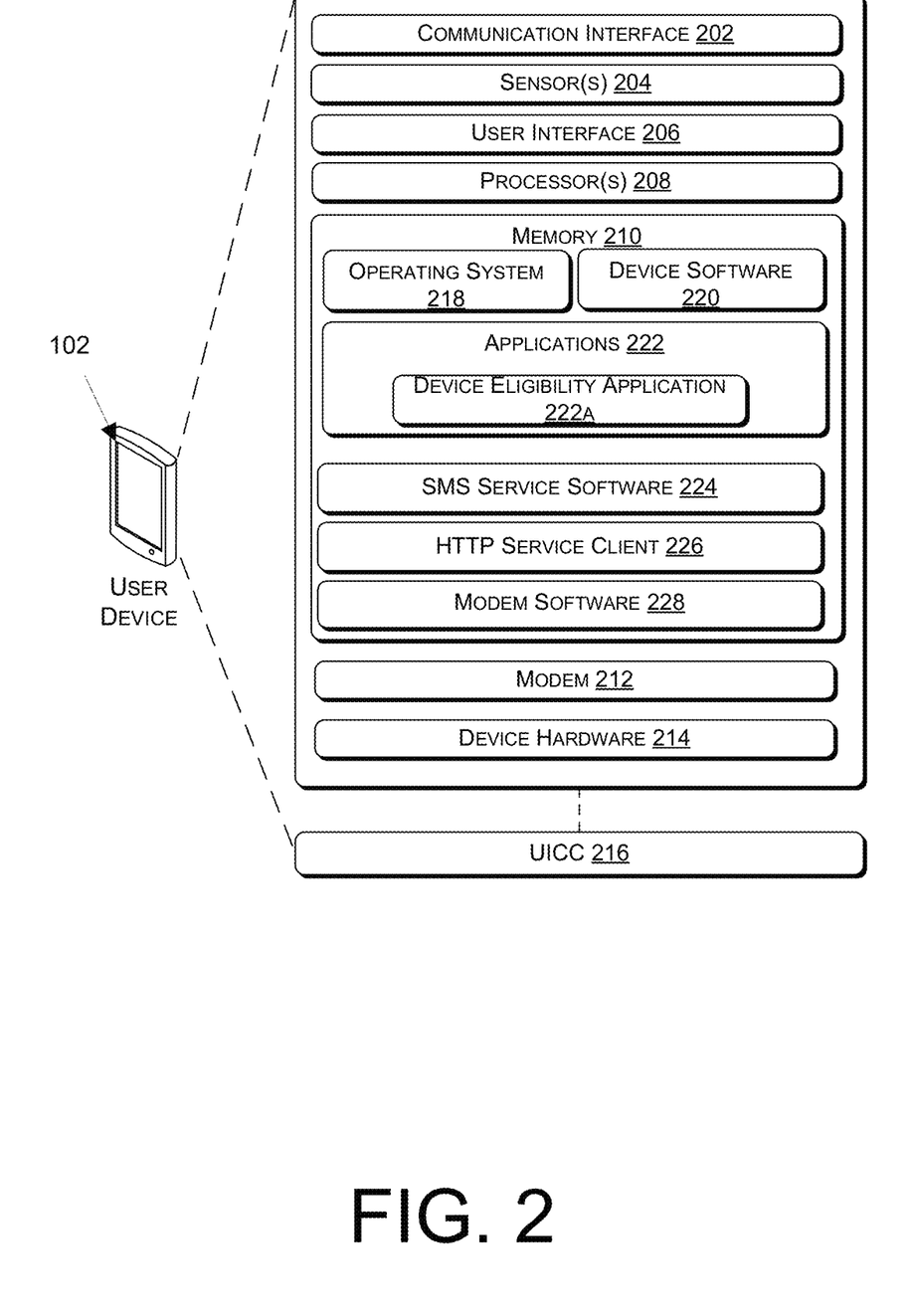
FIG. 2 is a block diagram showing various components of an illustrative user device.

FIG. 2 is a block diagram showing various components of an illustrative user device 102. The user device 102 may include a communication interface 202, one or more sensors 204, a user interface 206, one or more processors 208, and memory 210. The communication interface 202 may include wireless and/or wired communication components that enable the electronic device to transmit or receive voice or data communication via the radio access network 106, as well as other telecommunication and/or data communication networks. The sensors 204 may include a proximity sensor, a compass, an accelerometer, an altimeter, and/or a global positioning system (GPS) sensor. The proximity sensor may detect movement of objects that are proximate the user device 102. The compass, the accelerometer, and the GPS sensor may detect orientation, movement, and geolocation of the user device 102.

The user interface 206 may enable a user to provide input and receive output from the user device 102, including for example providing one or more input to initiate device activation. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media include, at least, two types of computer-readable media, namely computer storage media and communications media. Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 102 may also include a modem 212 and other device hardware 214 The modem 212 is a hardware component that enables the user device 102 to perform telecommunication and data communication with the radio access network 106. The device hardware 214 may include other hardware that is typically located in a mobile telecommunication device. For example, the device hardware 214 may include signal converters, antennas, hardware decoders and encoders, graphic processors, a Universal Integrated Circuit Card (UICC) slot (e.g., SIM slot), and/or the like that enables the user device 102 to execute applications and provide telecommunication and data communication functions. The UICC 216 may be an integrated circuit chip that is inserted into the UICC slot of the user device 102, or an embedded UICC that is hardwired into the circuit board of the user device 102.

The one or more processors 208 and the memory 210 of the user device 102 may implement an operating system 218, device software 220, one or more applications 222, SMS service software 224, a HTTP service client 226, and modem software 228. The various software and applications may include routines, program instructions, objects, and/or data structures that perform particular tasks or implement particular abstract data types. The operating system 218 may include components that enable the user device 102 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment, such as a Java Virtual Machine or Microsoft's Common Language Runtime™, for the execution of the applications 222. The operating system 218 may include a presentation component that presents the output (e.g., display the data on an electronic display, store the data in memory, transmit the data to another electronic device, etc.).

The operating system 218 may include an interface layer that enables applications to interface with the modem 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the user device to perform functions. For example, the device software 220 may include basic input/output system (BIOS), Boot ROM, or a bootloader that boots up the user device 102 and executes the operating system 218 following power up of the device.

The applications 222 may include applications that provide utility, entertainment, and/or productivity functionalities to a user of the user device 102. For example, the applications 222 may include telephony applications, electronic mail applications, remote desktop applications, web browser applications, navigation applications, office productivity applications, multimedia streaming applications, and/or so forth.

The SMS service software 224 may provide the user device 102 with the ability to send and receive SMS messages from a Short Message Service Center (SMSC), such as an SMS server that resides on the radio access network 106. In various embodiments, the transmission of messages between the SMSC and the SMS service software 224 may be performed according to the Mobile Application Part (MAP) of the Signaling System 7 (SS7) protocol. The size of the SMS messages may be constrained by the protocol to 140 octets or 1120 bits. The SMS messages may be encoded using a variety of alphabets, such as the GSM 7-bit alphabet, the 8-bit data alphabet, the 16-bit UCS-2 alphabet, and/or so forth. In some embodiments, the SMS messages that are passed between the SMS service software 224 and the SMSC may be encrypted and decrypted by both parties according to the SCP80 OTA secure channel protocol, or another equivalent secure SMS communication protocol.

The HTTP service client 226 may enable the user device 102 to establish a communication session with a server, such as a web server or a file service, using HTTP. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 226 may submit a HTTP request message, and the server may respond with a requested resource in a response message to the HTTP service client. In some embodiments, the HTTP service client may also use the HTTP Secure (HTTPS) protocol to communicate with a server, in which the communication session is encrypted by a security protocol, such as the Secure Socket Layer (SSL) protocol, the Transport Layer Security (TLS) protocol, and/or so forth.

The modem software 228 may drive the modem 212 to perform telecommunication and data communication with the radio access network 106. The modem software 228 may be firmware that is stored in dedicated non-volatile memory of the user device 102. Such non-volatile memory may include read-only memory (ROM), erasable programmable read-only memory (EPROM), or flash memory.

Figure 3:
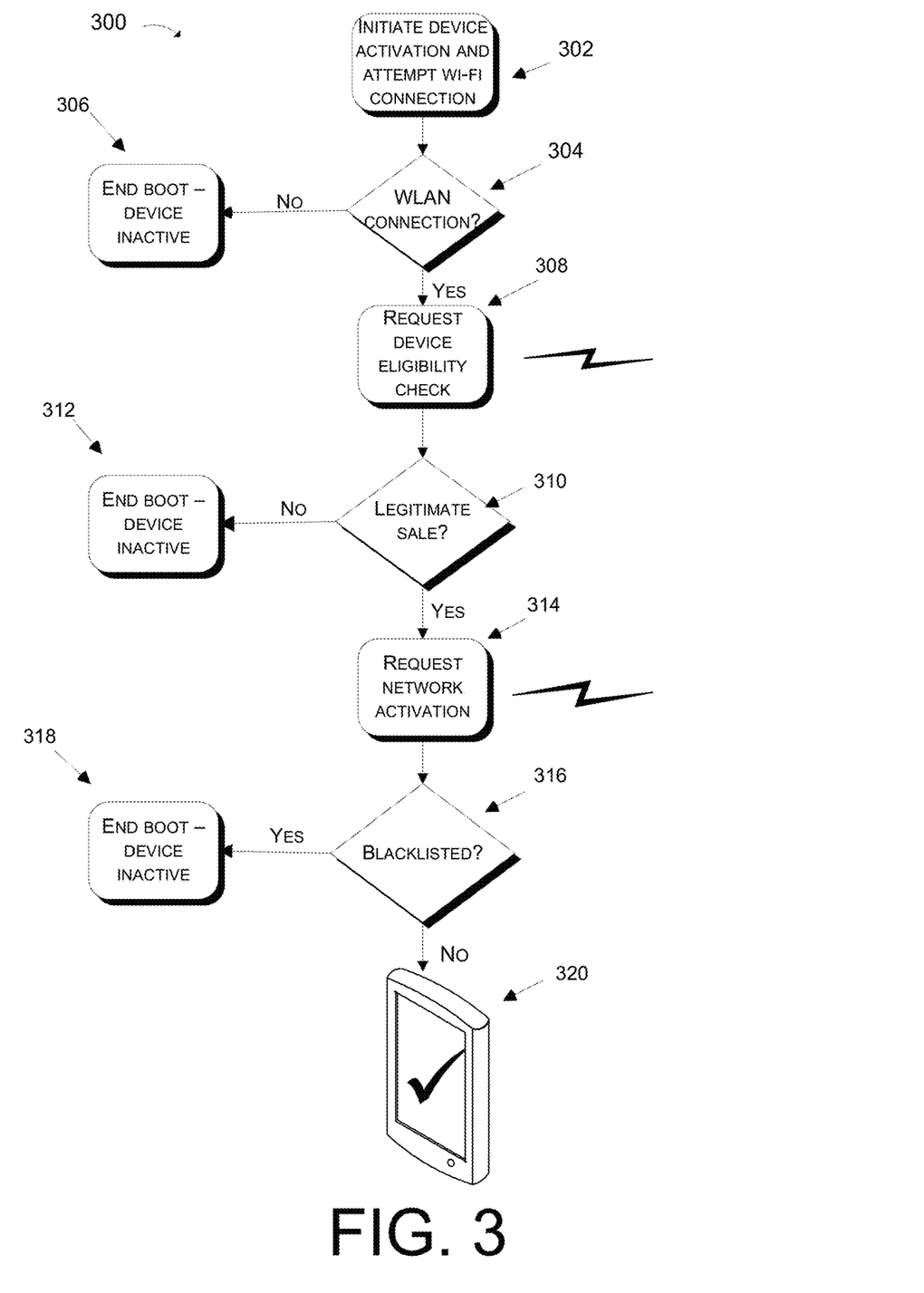
FIG. 3 is a flow diagram of an example process for implementing device activation enablement.
Figure 5:
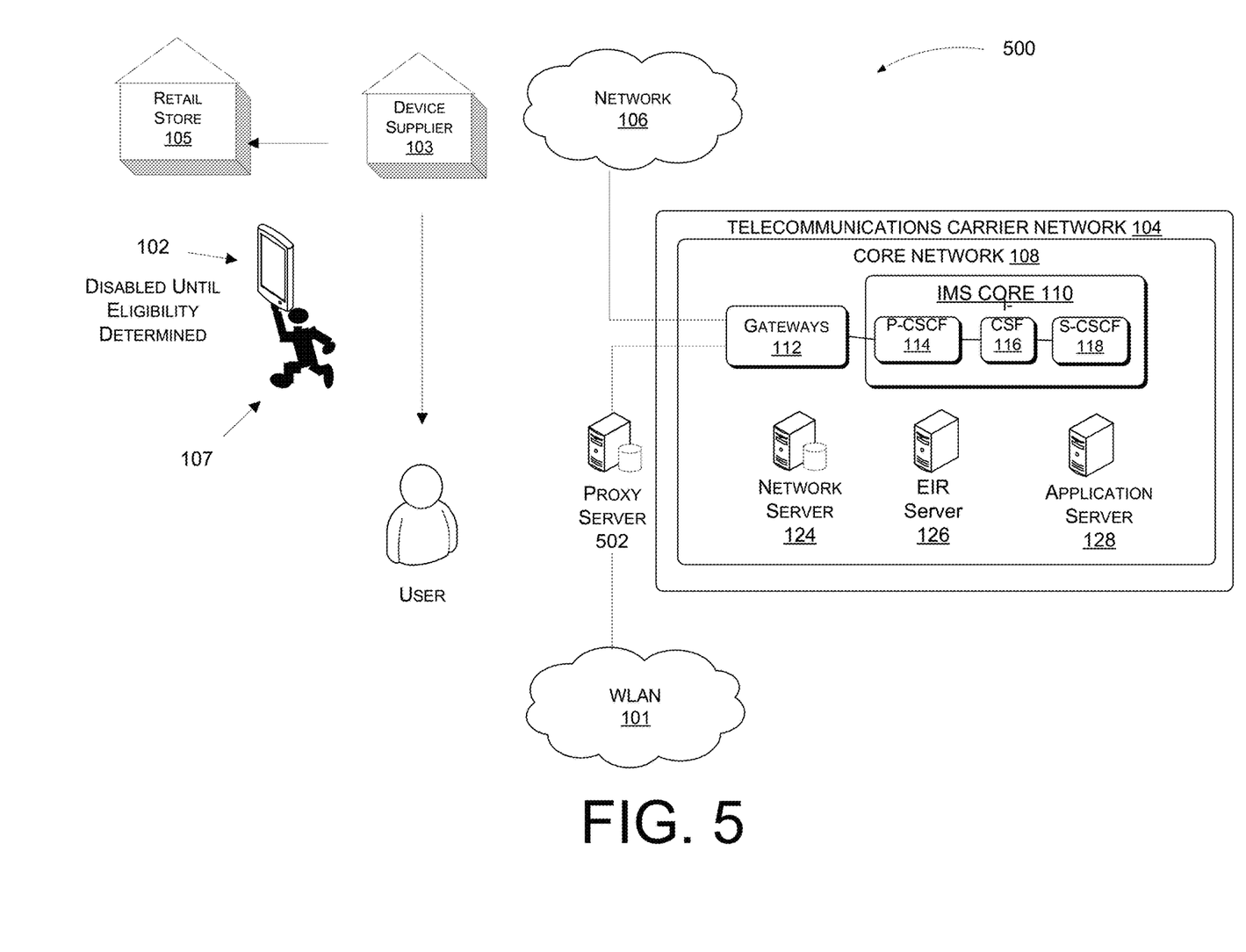
FIG. 5 illustrates an example network architecture to implement device activation enablement, in which a proxy server is utilized as a security measure.
Figure 6:
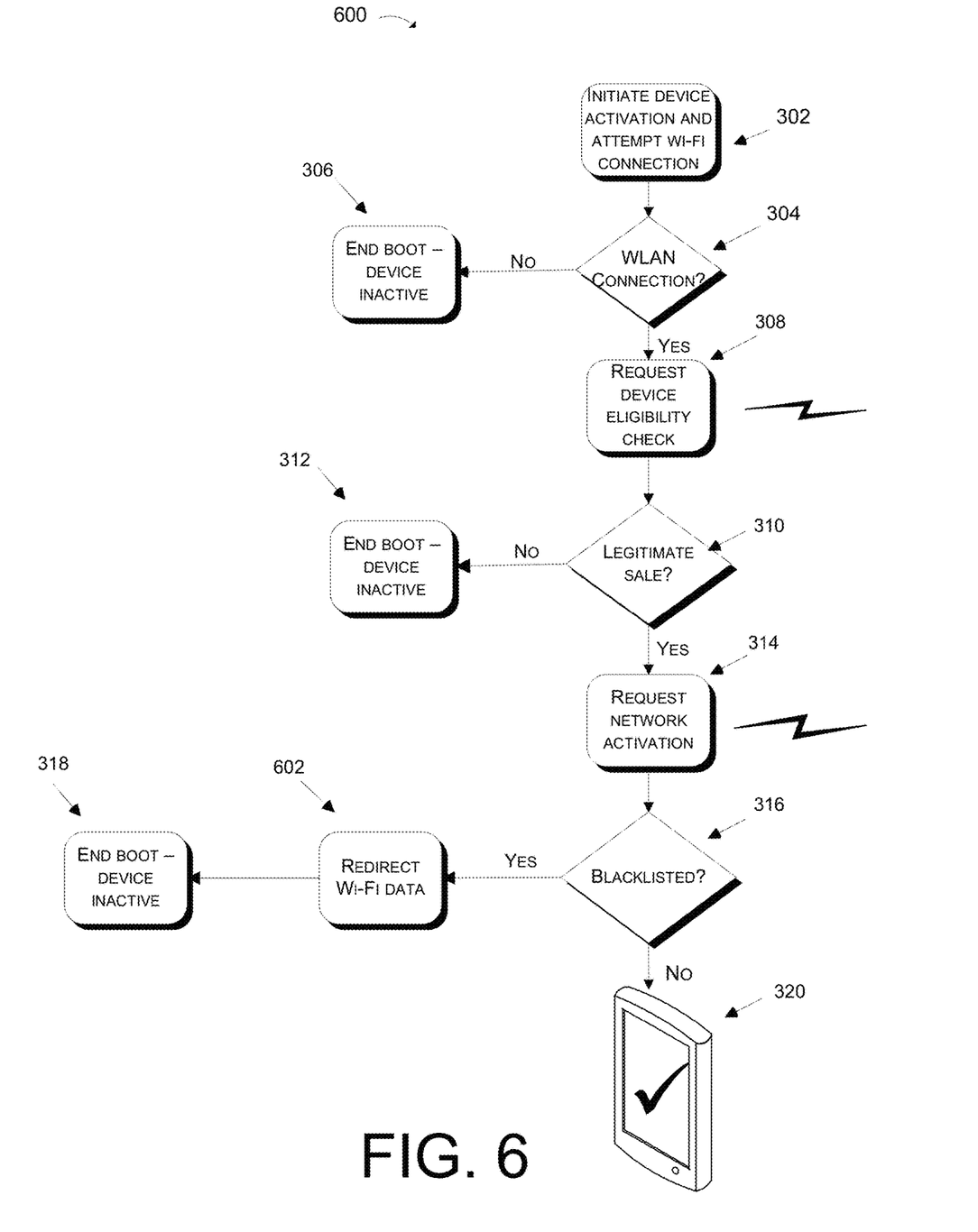
FIG. 6 is a flow diagram of an example process for implementing device activation enablement, in which a request for Wireless Local Area Network (WLAN) connectivity is directed toward the proxy server.

FIGS. 3 and 6 present illustrative processes 300 and 600, respectively, for implementing device activation enablement. Each of the processes 300 and 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 600 are described with reference to the network architecture 100 of FIG. 1 and the network architecture 500 of FIG. 5, respectively.

FIG. 3 is a flow diagram of an example process 300 for implementing device activation enablement, including device and network activation phases. In some embodiments, at least part of the process 300 may run in parallel with at least part of a typical "out-of-box" setup. At block 302, a device activation phase may be initiated with respect to the user device 102 by execution of a device eligibility application 222a of the applications 222 in response to an action by a user via the user interface 206 or by another operator (e.g., an application automatically executed). For example, after powering on the user device 102, the user may cause the device eligibility application 222a to be executed and attempt to enable WLAN communication, or the device eligibility application 222a may be automatically executed and attempt to enable WLAN communication in response to the user device 102 being powered on. The user device may obtain the application 222a by downloading it from an external source such as the applications server 128. Alternatively, or additionally, the application may be pre-loaded on the user device before shipping or sale.

At decision block 304, the device eligibility application 222a may determine whether a WLAN connection has been made. If the device eligibility application 222a determines that no WLAN connection has been made—due, for example, to a defective component on the user device 102 or to a lack of a functioning access point or other network component—("no" at decision block 304), the process may proceed to block 306. In some embodiments, an active SIM (e.g., a SIM that can connect to the telecommunications carrier network 104 and is capable of consuming network resources, subject to constraints such as compliance with a rate plan) may be required to enable WLAN connectivity. At block 306, the device eligibility application 222a may end the boot process, rendering the user device 102 inactive and/or with reduced functionality, and unable to proceed with network activation. In some embodiments, the user device 102 may be entirely disabled or "bricked" and thus useless for its purpose. In some embodiments, some functionality may be retained, such as, and without limitation, one or more of access to content on the user device 102, WLAN connectivity, or Emergency-911 (E911) capability.

Returning to decision block 304, if the application determines that a WLAN connection has been made ("yes" in decision block 304), the process may proceed to block 308. At block 308, the device eligibility application 222a may request a device eligibility check, e.g., from the network server 124. In some embodiments, the device eligibility check may proceed in parallel with at least part of the typical device setup during the device activation phase. In various embodiments, a typical device setup may include the boot process, which may be paused during the device eligibility check. In one or more embodiments, information identifying the user device 102 may be sent along with the request for checking against, e.g., a database of sale records. For example, the IMEI of the user device 102 may be sent. In some instances, the request may be sent via a WLAN connection before network activation has been completed.

At decision block 310, the user device 102 may receive from the network server 124 a determination made as a result of the device eligibility check, e.g., as to whether a legitimate sale of the user device 102 occurred. If the received determination is that the user device 102 was not legitimately sold ("no" at decision block 310), the user device 102 has failed the device eligibility check and the process 300 may proceed to block 312. At block 312, the device eligibility application 222a may end the boot process in response to the received determination, rendering the user device 102 inactive and/or with reduced functionality, and unable to request network activation. In some embodiments, the user device 102 may be entirely disabled or "bricked" and thus useless for its purpose. In some embodiments, some functionality may be retained, such as, and without limitation, one or more of access to content on the user device 102, WLAN connectivity, or E911 capability.

Returning to decision block 310, if the received determination is that there has been a legitimate sale of the user device 102 ("yes" at decision block 310), the user device 102 has passed the device eligibility check and the process 300 may proceed to block 314. At block 314, the device eligibility application 222a may request the EIR server 126 to grant network activation and access to the telecommunications carrier network 104. In some embodiments, the IMEI of the user device 102 may be sent along with the request and the EIR server 126 may check a database of blacklisted user devices to determine whether the user device 102 is included among them.

At decision block 316, the user device 102 may receive from the EIR server 126 a determination as to whether the user device 102 is blacklisted as having been stolen or denied network activation for another reason. If the received determination is that the user device 102 is blacklisted ("yes" at decision block 316), the process may proceed to block 318. At block 318, the device eligibility application 222a may end the boot process in response to the received determination, rendering the user device 102 inactive and/or with reduced functionality, and denying access to the telecommunications carrier network 104. In some embodiments, the user device 102 may be entirely disabled or bricked and thus useless for its purpose. In some embodiments, some functionality may be retained such as, and without limitation, one or more of access to content on the user device 102, WLAN connectivity, or E911 capability.

Returning to decision block 316, if the received determination indicates that the device is not blacklisted ("no" at decision block 316), the user device 102 has passed the EIR query and the process 300 may proceed to block 320. At block 320, the boot process and network activation may be completed, and the user device 102 is enabled for telecommunications carrier network access.

In accordance with the process 300, the user device 102 must pass the device eligibility check to obtain full functionality and access to the telecommunications carrier network 104. If the user device 102 was obtained illicitly such as by theft, or if the user attempts to obtain full functionality and network access by fraud such as in the case of an unpaid subsidized user device, the user device 102 may be disabled, thereby discouraging theft and fraud by making the user device 102 less desirable and therefore less valuable.

Figure 4:
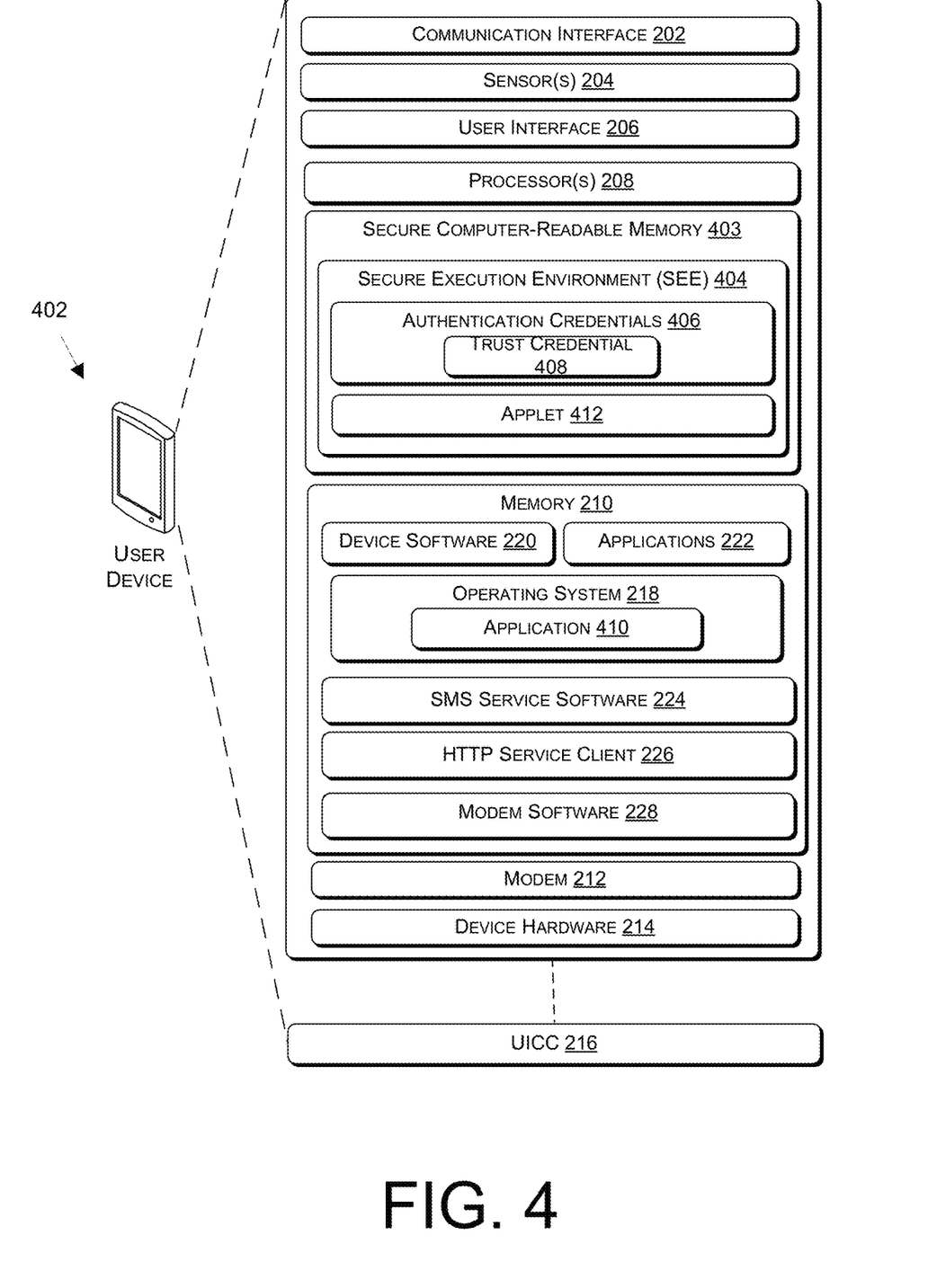
FIG. 4 is a block diagram showing various components of an illustrative user device which utilizes a secure execution environment (SEE).

FIG. 4 is a block diagram showing various components of an illustrative user device 402 which utilizes a secure computer-readable memory 403 that includes a secure execution environment (SEE) 404. The user device 402 illustrated in FIG. 4 may include many of the components of the user device 102 illustrated in FIG. 1, noting that the memory 210 in the user device 102 and/or the user device 402 may be "insecure" standard computer-readable memory, in contrast with the secure environment in which the SEE is resident. Further description of components that are common to the user device 102 and the user device 402 will not be repeated for brevity.

In some embodiments, the one or more processors 208 and the memory 210 of the user device 402 may implement the SEE 404. The SEE 404 is an isolated execution space that is provided by dedicated software and/or hardware of the user device 402. For example, the SEE 404 may employ a dedicated memory space or memory chip that is not accessible by applications and/or hardware components not located in the dedicated memory space or memory chip, unless such applications and/or hardware components are provided with special access privileges through secure communication channels and application programming interfaces (APIs). In alternative instances, the applications that reside in the SEE 404 may be executed by a dedicated processor. The secure computer-readable memory 403 and one or more of the processor(s) 208 may physically be separate or in the same chip. The isolation of the SEE 404 provides a high level of security for the execution of code or the processing of data stored in the execution space.

In various embodiments, the SEE 404 may store various authentication credentials 406 that include a device key, a modem key, and a public key of a public-private key pair. The device key may be unique to the user device 402. In some embodiments, the device key may be stored into the SEE 404 at the time the device is manufactured. In other embodiments, the device key may be generated on demand from a device seed value that is assigned to the user device 402 at the time of manufacture. Likewise, the modem key may uniquely identify the modem 212 that is installed in the user device 402. In some embodiments, the modem key may be assigned to the modem 212 at the time the modem 212 is manufactured. In other embodiments, the modem key may be generated on demand from a modem seed value that is assigned to the modem 212 at the time of manufacture.

The authentication credentials 406 stored in the SEE 404 may further include a trust credential 408. The trust credential 408 may be a unique trusted environment key that is assigned to the SEE 404 by the manufacturer of the hardware that implements the SEE 404. Furthermore, the identity of the user device 402, such as the IMEI of the user device 402, may also be known to the manufacturer of such hardware. In various embodiments, the trusted environment key and its relationship to the SEE 404, as well as its association with the user device 402, is also known to a trust authentication authority that may be called upon to validate the trusted environment key. The SEE 404 may also store a public key, e.g., a public certificate, of a public-private key pair. For example, the public key may be embedded into the dedicated memory space of the SEE 404 by the manufacturer of the SEE 404. The telecommunications carrier, in turn, may obtain the private key that corresponds to the public key from the manufacturer.

In some embodiments, in an already setup user device 402 (i.e., device-activated user device 402 that has passed the eligibility check), an application 410, which may exist in the operating system 218 as illustrated, may manage an applet 412 running in the SEE 404 and, in response to a device reset, query the applet and/or a network server for the status of the user device 402. The application and applet may be resident in the user device 402 when initially shipped to the retailer or user. In some embodiments, the application 410 may query the SEE applet and, in response to determining that the user device 402 has been reset, may take over the operating system 218 of the user device 402 to dictate functionality (for example, limiting functionality to E911 and/or device/network eligibility or authentication check-ins). In some embodiments, the application may query a network server such as the network server 124, which may be an entitlement server, to determine entitlement based on, e.g., authorization, subscriber/device authentication, and/or sales information (for example, whether the subscriber of the user device 402 has paid for or is in default with respect to a service). The network server query may include a device identifier for the user device 402 (such as its IMEI) and/or the device's mobile station international subscriber directory number (MS ISDN).

FIG. 5 illustrates an example network architecture 500 to implement device activation enablement, in which a proxy server is utilized as a security measure. The network architecture 500 illustrated in FIG. 5 may include many of the components of the network architecture 100 illustrated in FIG. 1, the description of which will not be repeated for brevity.

Network architecture 500 may include, in addition to one or more of the network server 124, the EIR server 126, and the applications server 128, a proxy server 502. The proxy server 502 may be outside the core network as shown. In one or more embodiments, the proxy server 502 may be included in the core network. In some embodiments, the WLAN connection may be directed to the proxy server 502 and, if the user device 102 has been illicitly obtained, the WLAN data traffic (or DNS queries) may be redirected to a new endpoint.

FIG. 6 is a flow diagram of an example process 600 for implementing device activation enablement, in which a request for WLAN connectivity is directed toward the proxy server 502. The flow diagram 600 illustrated in FIG. 6 may include many of the components of the flow diagram 300 illustrated in FIG. 3, the description of which will not be repeated for brevity In the process 300, if the user device 102 is blacklisted ("yes" at decision block 316), the boot process may be ended in block 318 in response to the received determination. In the process 600, the flow may proceed from block 316 to block 602 and the WLAN communication may be redirected to an endpoint at which the boot process may be discontinued. In some embodiments, the endpoint may be any point that can implement shutting down the boot process. Examples include but are not limited to carrier side kill switch servers which access the user device 102.

Figure 7:
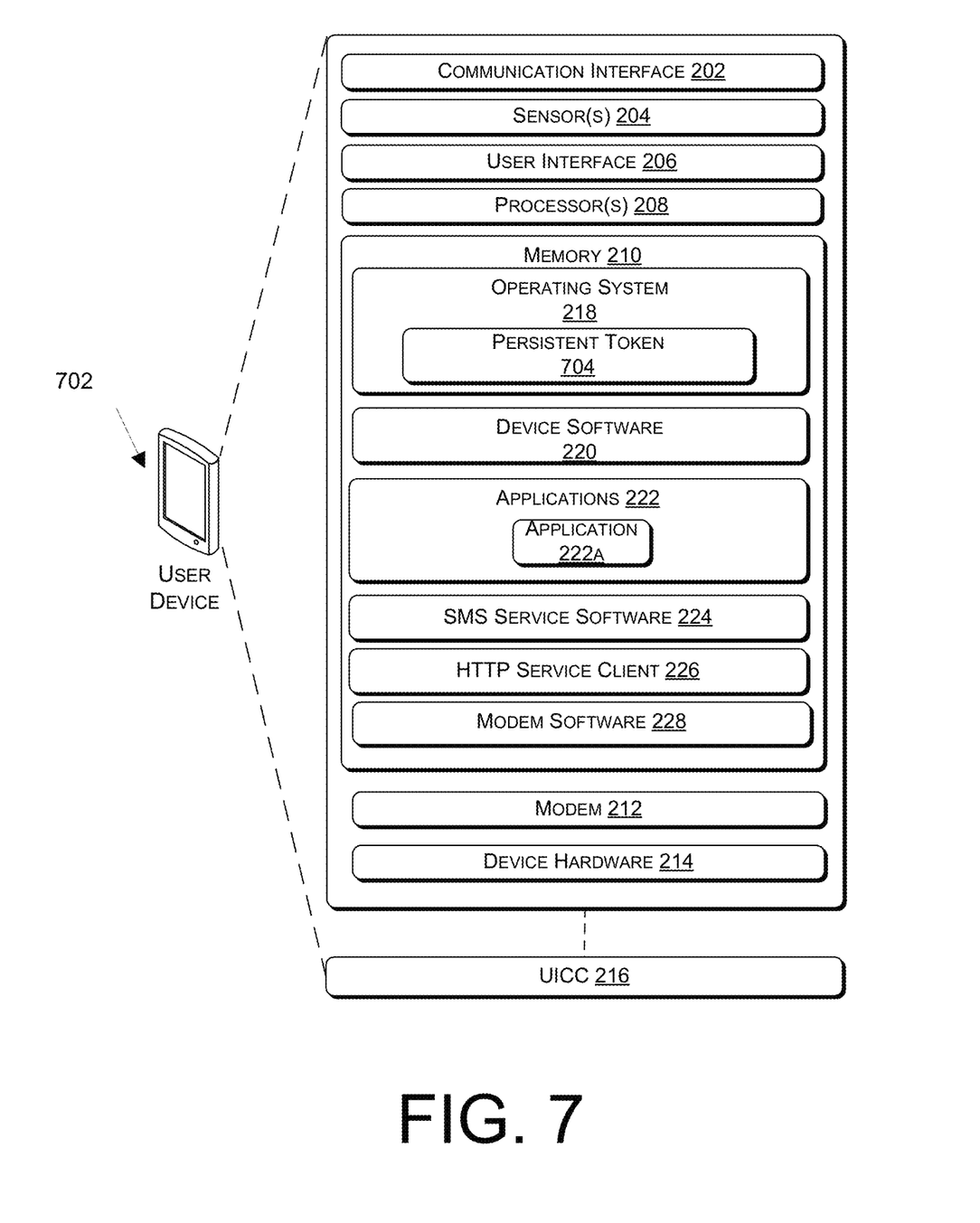
FIG. 7 is a block diagram showing various components of an illustrative user device, which includes a persistent token in the operating system.

FIG. 7 is a block diagram showing various components of an illustrative user device 702, which includes a persistent token 704 in the operating system 218. The user device 702 illustrated in FIG. 7 may include many of the components of the user device 102 illustrated in FIG. 2, the description of which will not be repeated for brevity.

The persistent token 704 may refer to a piece of software that may be received from a network server (e.g., the network server 124) in the core network 108 and stored in secure computer-readable memory in the operating system 218 on the user device 702, to be used for authenticating the subscriber and/or user device 702 to the network server 124 (for example, an entitlement and/or sales server maintained by the network access provider in the core network 108). In some embodiments, the persistent token 704 may be retained to avoid having to prompt the user to login for each device eligibility check. The persistent token 704 may be "persistent" in that it is retained on the user device 702 even if the user device 102 is wiped.

In one or more embodiments, the persistent token 704 may be generated from an encryption of formatted data that may include the device and/or MSISDN. By way of non-limiting example, the persistent token 704 may be stored in the user device 702 at time of shipping and/or stored in the user device 702 prior to attempting device activation in the process 300. In some embodiments, the device eligibility application 222a may send the persistent token 704 with the request for the device eligibility check in block 308. If the network server 124 is able to decrypt the persistent token 704, the device/MSISDN may be checked for eligibility as described above with respect to the process 300.

Figure 8:
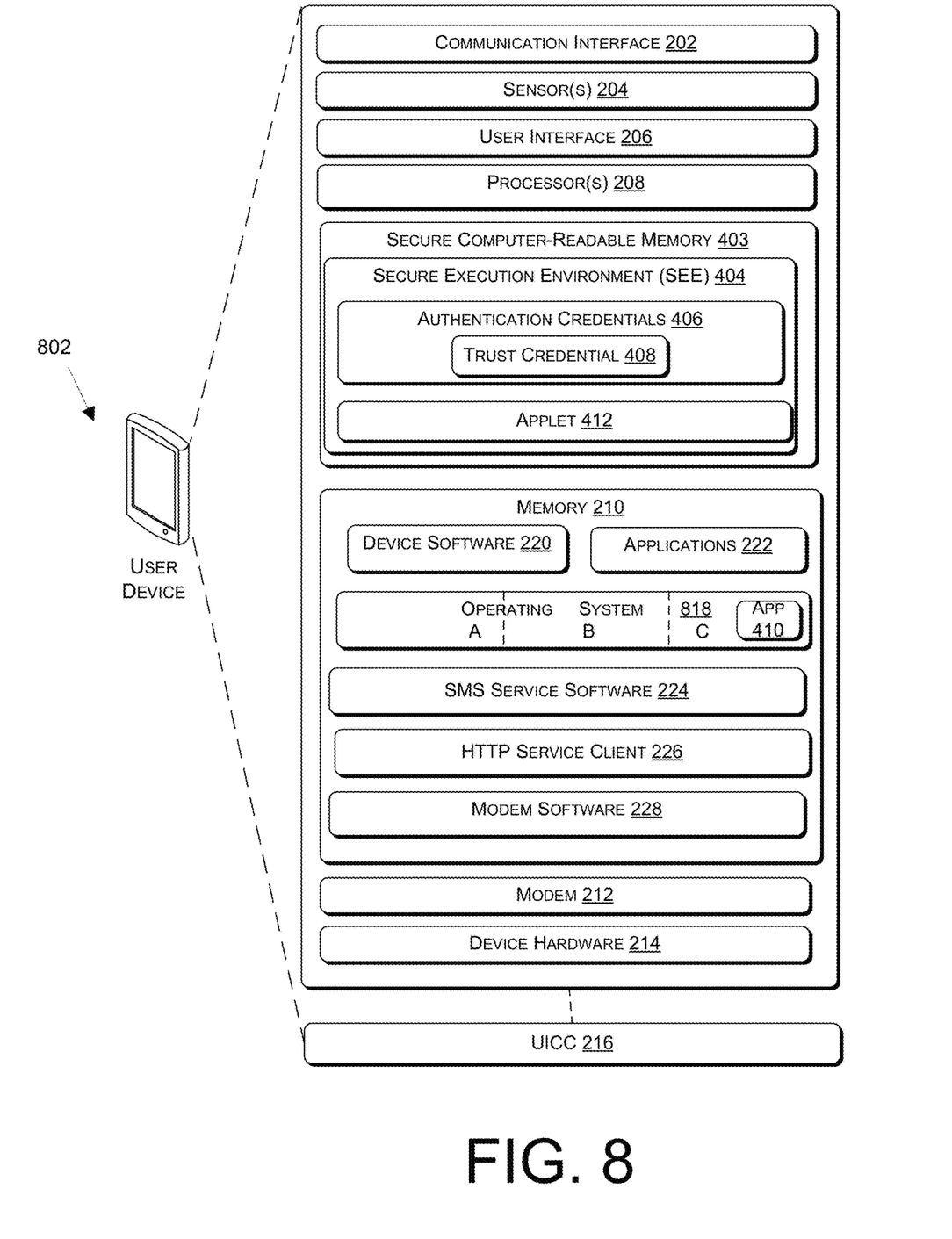
FIG. 8 is a block diagram showing various components of an illustrative user device, including a modularized operating system that may separate the operating system framework, the hardware-level code, and a "mini-OS."

FIG. 8 is a block diagram showing various components of an illustrative user device 802, including a modularized operating system 818 that may separate the operating system framework, the hardware-level code, and a "mini-OS." The user device 802 illustrated in FIG. 8 may include many of the components of the user device 402 illustrated in FIG. 4, the description of which will not be repeated for brevity.

In some embodiments, the operating system 818 may be separated into three partitions: an A partition that may contain the OS framework, a B partition that may contain lower-level hardware (e.g., vendor) code, and a C partition that may contain a primary mini-OS with limited functionality until the user device is authenticated according to, e.g., the process 300 or the process 600 described above.

In various embodiments, the mini-OS may allow for one or more of network registration, E911 dialing, and network logic to handle a SEE flag in the SEE 404. For example, the network-controlled SEE flag may determine normal boot vs. controlled boot in the SEE by appropriate setting of the SEE flag. In some embodiments, the mini-OS may be invoked at the beginning of device activation (in this example, at the beginning of the process 300) and be able to be re-enabled based on a network trigger if the user device 802 is determined to be ineligible for device activation in the block 310 or blacklisted for network activation in the block 316, for example. In some embodiments, the user device 802 may be shipped to the retailer or directly to the purchaser in controlled boot state (i.e., with the mini-OS invoked) and enabled (i.e., with full OS invocation and device/network access) upon network activation. In various embodiments, although the user device 802 may be unlocked, it may be relocked by setting/resetting the SEE flag in the event of, for example, theft, fraud on the carrier, unauthorized secondary sales, and so forth as may be determined post-activation.

In accordance with one or more of the embodiments described herein, performing a device eligibility check in a device activation phase (e.g., the "out-of-box setup") prior to network activation before completing the boot process permits rendering the user device with reduced or no functionality on failing the eligibility check before attempting network activation. This may reduce the incentive for theft of devices when in transit to the user or retailer and theft of devices from the retail store, as the user device is incapable of network activation until completing device activation out of the box. Device eligibility checks after initial device activation, such as in the case of a factory reset or account default, may also reduce unauthorized and/or fraudulent use of the device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed on a user device, comprising:
    during a boot process of the user device in a device activation phase for activation of the user device:
        receiving at the user device an eligibility request to obtain an eligibility determination for a user's eligibility to gain access via the user device to a communication network to which the user has not obtained access entitlement via the user device;
        submitting the eligibility request over a wireless local area network (WLAN) different from the communication network;
        obtaining the eligibility determination in response to the eligibility request over the WLAN;
        determining whether the obtained eligibility determination is eligible or ineligible;
        in response to determining that the obtained eligibility determination is eligible:
            completing the boot process, and
            initiating a network activation phase that includes sending a request to activate the user device for access to the communication network, and
        in response to determining that the obtained eligibility determination is ineligible,
            discontinuing the boot process before its completion.

2. The computer-implemented method of claim 1, wherein submitting the eligibility request is performed during the device activation phase before network registration.

3. The computer-implemented method of claim 1, wherein the method is controlled by an application resident on the user device.

4. The computer-implemented method of claim 1, comprising:
    configuring the eligibility request for requesting an entitlement server to determine entitlement based on sales information related to a sale of the user device, wherein submitting the eligibility request includes submitting the configured eligibility request to the entitlement server over the WLAN;
    wherein obtaining the eligibility determination includes obtaining the eligibility determination from the entitlement server over the WLAN.

5. The computer-implemented method of claim 1, wherein the eligibility determination is based at least on a status of an account related to the user device.

6. The computer-implemented method of claim 1, wherein the eligibility request is configured for requesting an entitlement server to determine entitlement based on sales information related to a sale of the user device.

7. The computer-implemented method of claim 1, wherein the communication network is a cellular communication network.

8. A user device comprising:
    one or more processors;
    a secure computer-readable memory with a secure execution environment (SEE) to maintain an applet and a first application executable by the one or more processors, the first application configured to initiate a device activation phase for activation of the user device in response to a device activation input, and
    standard computer-readable memory to maintain a plurality of components executable by the one or more processors, the plurality of components comprising a second application configured, in response to initiation of the device activation phase by the first application, to:
        receive at the user device an eligibility request to obtain an eligibility determination for a user's eligibility to gain access via the user device to a communication network to which the user has not obtained access entitlement via the user device;
        submit the eligibility request over a wireless local area network (WLAN);
        obtain the eligibility determination in response to the eligibility request over the WLAN;
        determine whether the obtained eligibility determination is eligible or ineligible;
        in response to determining that the obtained eligibility determination is eligible:
            initiate a network activation phase that includes sending a request to activate the user device for access to the communication network; and
        in response to determining that the obtained eligibility determination is ineligible:
            discontinue the device activation phase and disable the user device;
    wherein the first application is configured to:
        query the applet as to a status of the user device;
        determine from the applet that that the user device has been rest; and
        in response to determining that the usr device has been reset;
            query an entitlement server to determine entitlement of the user to access the communication network via the user device; and
            disable at least one function of the user device in response to determining a lack of the entitlement.

9. The user device of claim 8, comprising downloading the first application and the applet to the user device.

10. The user device of claim 8, wherein the application is configured to manage executing, in the SEE, the applet such that the applet executes prior to any functionality in the reset user device resident in the standard computer-readable memory.

11. The user device of claim 8, wherein the application is further configured to manage executing, in the SEE, the applet to render the device inactive with no functionality in response to determining that the obtained eligibility determination is ineligible.

12. The user device of claim 8, wherein the application is configured to:
    in response to determining that the obtained eligibility determination is ineligible, connect the user device for WLAN communication with an endpoint via a proxy.

13. The user device of claim 8, wherein the eligibility determination is based at least on a status of an account related to the user device.

14. The user device method of claim 8, wherein the eligibility request is configured for requesting an entitlement server to determine entitlement based on sales information related to a sale of the user device.

15. The user device of claim 8, wherein the communication network is a cellular communication network.

16. A method to enable activation of a disabled user device for network communication, comprising:
providing a network-communication-disabled user device having:
one or more processors,
a secure computer-readable memory with a secure execution environment (SEE) to maintain a first application executable by the one or more processors, wherein the first application is configured to:
determine that the user device has been reset; and
in response to determining the user device has been reset:
query an entitlement server to determine entitlement of the user to access the communication network via the user device; and
disable at least one function of the user device in response to determining a lack of the entitlement; and
standard computer-readable memory to maintain a plurality of components executable by the one or more processors, the plurality of components comprising a second application configured to:
receive at the user device an eligibility request to obtain an eligibility determination for a user's eligibility to gain access via the user device to a communication network to which the user has not obtained access entitlement via the user device;
submit the eligibility request over a wireless local area network (WLAN);
obtain the eligibility determination in response to the eligibility request over the (WLAN);
determine whether the obtained eligibility determination is eligible or ineligible;
in response to determining that the obtained eligibility determination is eligible:
initiate a network activation phase that includes sending a request to activate the user device for access to the communication network; and
in response to determining that the obtained eligibility determination is ineligible:
discontinue the device activation phase; and
lock the user device to disable the user device from access to the communication network;
receiving the eligibility request from second application at an entitlement server over the (WLAN);
determining eligibility of the user device in response to the eligibility request to complete the eligibility determination for the user's eligibility for access to the communication network;
providing the eligibility determination from the entitlement server to the second application over the (WLAN);
receiving the query from the first application;
determining entitlement of the user to access the communication network via the user device in response to the query; and
sending to the first application a response to the query.

17. The method of claim 16, comprising:
in response to determining that the eligibility determination is eligible, unlocking the user device to enable the sending of the request for access to the communication network.

18. The method of claim 16, wherein the eligibility determination of ineligible is based at least on a delinquency in an account related to the user device.

19. The method of claim 16, wherein the eligibility request is configured for requesting the entitlement server to determine entitlement based on sales information related to a sale of the user device.

20. The method of claim 16, wherein the communication network is a cellular communication network.

\* \* \* \* \*